(12) United States Patent
Cavalleri et al.

(10) Patent No.: US 7,685,940 B1
(45) Date of Patent: Mar. 30, 2010

(54) ROCKET MOTOR WITH PELLET AND BULK SOLID PROPELLANTS

(75) Inventors: Robert J. Cavalleri, Coral Springs, FL (US); Thomas A. Olden, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/053,475

(22) Filed: Mar. 21, 2008

(51) Int. Cl.
*F42B 15/10* (2006.01)
*F02K 9/12* (2006.01)
(52) U.S. Cl. .......................... 102/376; 60/253
(58) Field of Classification Search ............... 102/374, 102/376, 380; 60/253
See application file for complete search history.

(56) References Cited

U.S. PATENT DOCUMENTS

| | | | |
|---|---|---|---|
| 2,986,001 A | 5/1961 | Green | |
| 4,249,673 A | 2/1981 | Katoh et al. | |
| 4,539,910 A * | 9/1985 | Stevens | 102/349 |
| 4,738,100 A * | 4/1988 | Koorey | 60/256 |
| 5,024,160 A * | 6/1991 | Canterberry et al. | 102/323 |
| 5,440,993 A | 8/1995 | Osofsky | |
| 5,608,183 A | 3/1997 | Barnes et al. | |
| 5,675,966 A * | 10/1997 | Dombrowski et al. | 60/204 |
| 5,959,235 A * | 9/1999 | Wagstaff | 102/202 |
| 6,352,030 B1 * | 3/2002 | Doll et al. | 102/291 |
| 6,357,357 B1 * | 3/2002 | Glasser | 102/374 |
| 6,554,936 B1 * | 4/2003 | Metcalf et al. | 156/172 |
| 6,647,888 B1 * | 11/2003 | Cesaroni et al. | 102/289 |
| 6,692,655 B1 | 2/2004 | Martins et al. | |
| 6,739,121 B2 * | 5/2004 | Kline et al. | 60/251 |
| 6,745,696 B1 * | 6/2004 | Rotkopf | 102/376 |
| 6,968,676 B1 * | 11/2005 | Krishnan | 60/250 |
| 7,003,942 B2 * | 2/2006 | Le Helley et al. | 60/219 |
| 7,022,196 B2 * | 4/2006 | Cesaroni et al. | 149/2 |
| 7,194,852 B1 * | 3/2007 | Krishnan | 60/250 |
| 2001/0003294 A1 | 6/2001 | Mahaffy | |
| 2002/0053377 A1 * | 5/2002 | Martin et al. | 149/17 |
| 2002/0129808 A1 * | 9/2002 | Manner | 126/45 |
| 2002/0157557 A1 * | 10/2002 | Cesaroni et al. | 102/291 |
| 2004/0244890 A1 * | 12/2004 | Cesaroni et al. | 149/3 |
| 2005/0188677 A1 * | 9/2005 | Nyberg et al. | 60/234 |

FOREIGN PATENT DOCUMENTS

GB    1 605 168    9/1982

OTHER PUBLICATIONS

European Patent Office, International Search Report and Written Opinion for Application No. PCT/US2009/033248, Mail Date: Dec. 8, 2009.
European Patent Office, International Search Report and Written Opinion for Application No. PCT/US2009/033694, Mail Date: Dec. 7, 2009.

* cited by examiner

*Primary Examiner*—Bret Hayes
(74) *Attorney, Agent, or Firm*—SoCal IP Law Group LLP; Steven C. Sereboff; John E. Gunther

(57) ABSTRACT

There is disclosed a solid fuel rocket motor which may include a case and a nozzle coupled to the case. A plurality of fuel pellets may be disposed within the case. An igniter may be disposed to ignite at least a portion of the fuel pellets. A pellet retainer may be positioned within the case to retain the plurality of fuel pellets within the case. The pellet retainer may be perforated to allow exhaust gases to flow from the ignited fuel pellets to the nozzle while preventing unburned fuel pellets from being expelled through the nozzle.

18 Claims, 8 Drawing Sheets

Time = t

220
$D_{c0}+2R_{bc}t$
222B

Time = t

225
$D_{p0}-2R_{bp}t$
222D

Time = 0

220
$D_{c0}$
222A

Time = 0

225
$D_{p0}$
222C

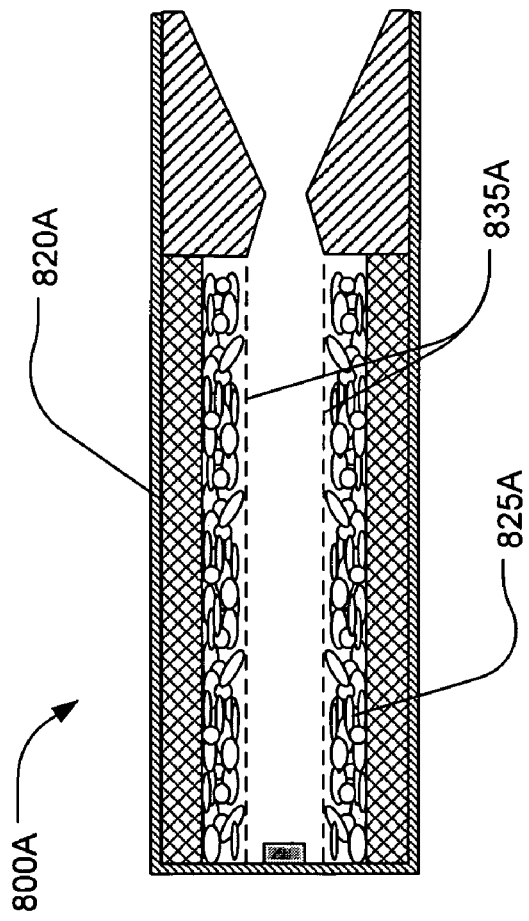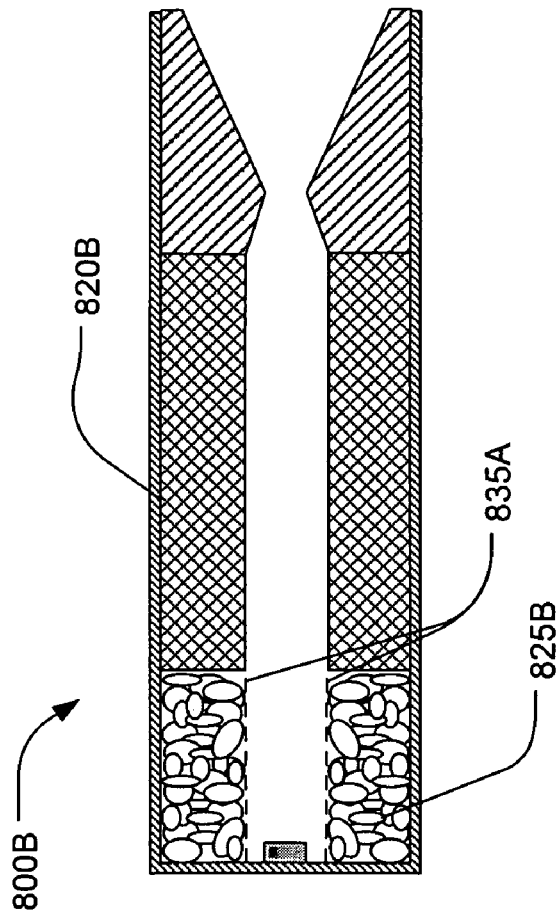

ROCKET MOTOR WITH PELLET AND BULK SOLID PROPELLANTS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to solid fuel rocket motors, and to fast response motors suitable for use as attitude control thrusters.

2. Description of the Related Art

Solid fuel rocket motors are commonly used in various configurations to propel rockets and missiles. Small solid fuel rocket motors may also be used to control the attitude and steering of a missile, rocket, or other projectile. Small solid fuel rocket motors used to control attitude are commonly called attitude thrusters or divert thrusters. Solid fuel rocket motors may also be used to turn a vertically-launched missile or rocket into near-horizontal flight. Such rocket motors are commonly called pitch-over thrusters.

The thrust or force produced by a rocket motor is given by the equation for an ideally expanded nozzle.

$$F = m_p * U_e \quad (1)$$

where $m_p$ = propellant mass flow rate, and $U_e$ = gas velocity.

The propellant mass flow rate $m_p$ is given by the equation $$m_p = A_p * R_b * P_p \quad (2)$$

where $A_p$ = propellant surface area, $R_b$ = propellant burn rate, and $P_p$ = propellant density.

Thus the propellant surface area $A_p$, the propellant burn rate $R_b$ and the propellant density $P_p$ are important factors that may be used to determine the thrust produced by a solid fuel rocket.

The force produced by a rocket motor results in a linear or angular acceleration of the missile or other body propelled by the rocket motor. The net change in the linear or angular velocity of the missile or other body is proportional to the force produced by the motor integrated over time. The time integral of the force produced by a rocket motor is commonly called the "impulse" of the motor.

DESCRIPTION OF THE DRAWINGS

FIG. 8A is a cross-sectional side view of an exemplary hybrid solid fuel rocket motor.

FIG. 8B is a cross-sectional side view of an exemplary hybrid solid fuel rocket motor.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
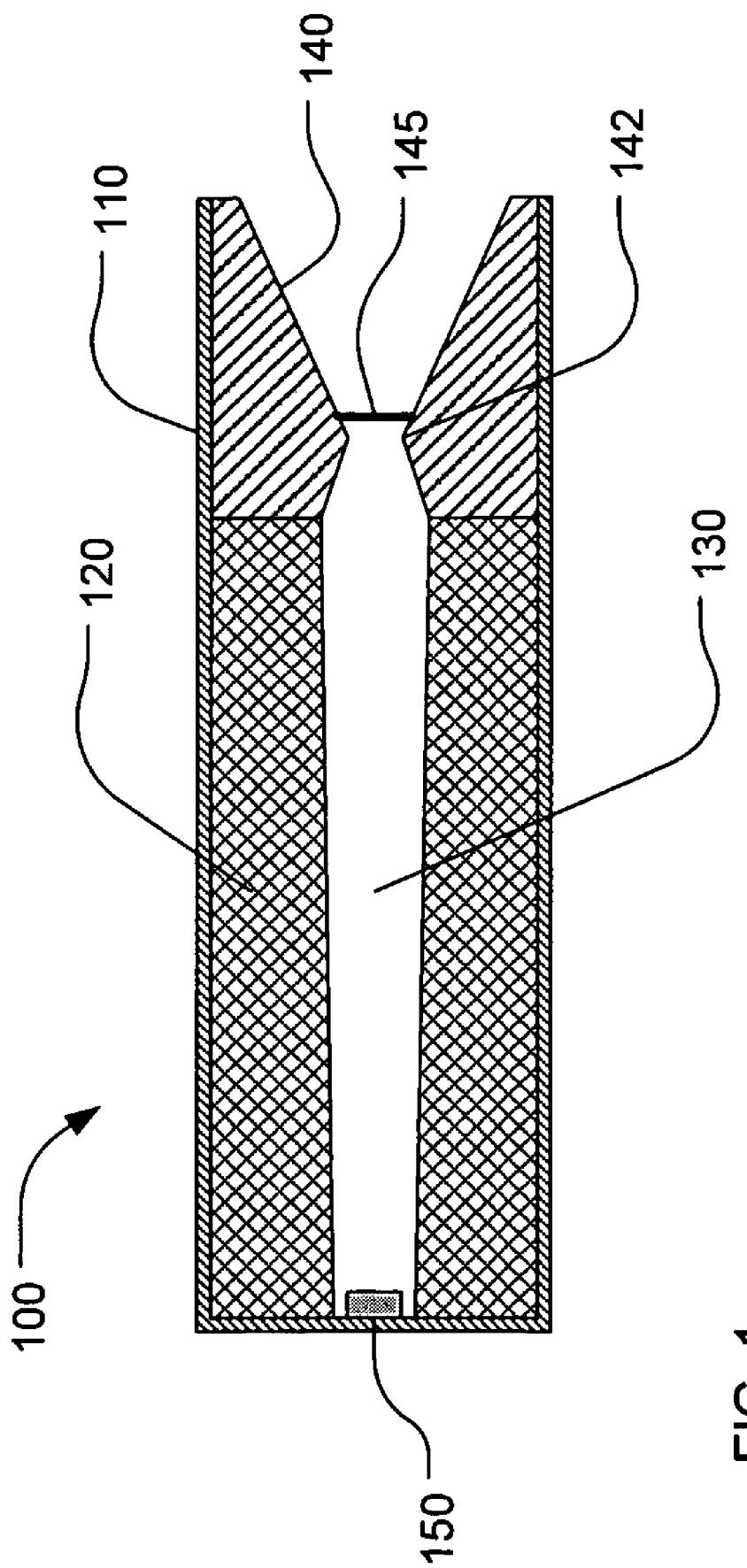
FIG. 1 is a cross-sectional side view of a conventional solid fuel rocket motor.

Referring now to the cross-section view of FIG. 1, a conventional solid fuel rocket motor 100 may include a case 110, a propellant charge 120 having a longitudinal opening 130, a nozzle 140, and an igniter 150. The propellant charge 120 may commonly be called the "grain". Note that the term "grain" is used to describe the propellant charge 120 as a whole, but does not refer to the weight of the propellant charge, the particle size of the material composing the propellant charge, or the surface texture of the propellant charge. Note that the propellant charge 120 may not be a single continuous mass of propellant material. For example, for ease of fabrication, the propellant charge 120 may be fabricated as two or pieces that are bonded or otherwise assembled within the rocket motor 100.

The propellant charge 120 may be any material including at least one fuel ingredient and at least one oxidizer ingredient. The propellant charge may be a so-called "single-base" material, such as nitrocellulose, where the same ingredient serves as both the fuel and oxidizer components. The propellant charge may be a so-called "double base" material, such as a mixture of nitrocellulose and nitroglycerine, having two or more ingredients that serve as both the fuel and oxidizer components. The propellant charge may be a so-called "composite" material wherein the fuel ingredient and the oxidizer ingredient may be in the form of fine particles held in a matrix of a synthetic rubber or plastic binder. A composite propellant charge may include other ingredients such as a plasticizer.

The binder and plasticizer may include energetic materials such as nitrocellulose, nitroglycerine, or other energetic materials. The propellant charge 120 may be formed by casting the selected material directly within the case 110. The propellant charge may be formed by casting or machining external to the case and may then be bonded or otherwise assembled into the case. A variety of propellant compositions are known. Exemplary propellant compositions are described in Chapter 12 of Rocket Propulsion Elements, by George Sutton and Oscar Biblarz (John Wiley & Sons, 2001).

In order to provide thrust, the surface area of the propellant charge 120 must burn to generate gas. To increase the burnable surface area, a longitudinal cavity 130 may be formed in the propellant charge 120. The longitudinal cavity 130 may commonly be centered on the longitudinal axis of the case 110. Once the propellant charge 120 is ignited by the igniter 150, the burning area may rapidly spread to include the entire surface of the propellant charge 120 facing the longitudinal cavity 130 and, in some cases, the end of the propellant charge 120 proximate to the nozzle 140. A propellant charge with a longitudinal cavity may be termed a "center-perforated grain" or an "inside burning grain".

The igniter 150 may be a small charge of flammable material that, when burned, releases a predetermined amount of hot combustion gases. The combustion of the igniter may be initiated, for example, by an electric current flowing through a heater wire adjacent to, or embedded in, the flammable igniter material. In order to ignite the propellant charge 120, the temperature and pressure of the gases produced by the igniter 150 may need to exceed predetermined values. To allow pressure to build within the cavity 130, and thus facilitate ignition of the propellant charge 120, the cavity 130 may be sealed by an environmental seal 145. The environmental seal 145 may also serve to protect the rocket motor 100 from environmental effects, such as humidity and precipitation.

The environmental seal 145 may be designed to rupture or blow free from the motor after the pressure within the cavity 130 exceeds a predetermined pressure level, which may be, for example, between 100 and 500 pounds per square inch (PSI). For example, the environmental seal may be retained in the nozzle by means of shear pins that fracture when the pressure exceeds the predetermined level. The environmental seal may be a burst disc having intentional structural weakness that allows the burst disc to rupture in a controlled manner when the pressure exceeds the predetermined level.

As shown in FIG. 1, the environmental seal 145 may be disposed at or near the portion of the nozzle 140 having the smallest cross-sectional area, commonly termed the throat 142. The environmental seal 145 may be disposed at other locations within the nozzle 140.

Since the ignition of the propellant charge 120 starts at the end proximate to the igniter and then proceeds along the length of the longitudinal cavity, the longitudinal cavity may be tapered slightly, as shown in FIG. 1, to maintain a relatively constant core velocity and minimize erosive burning.

Figure 2B:
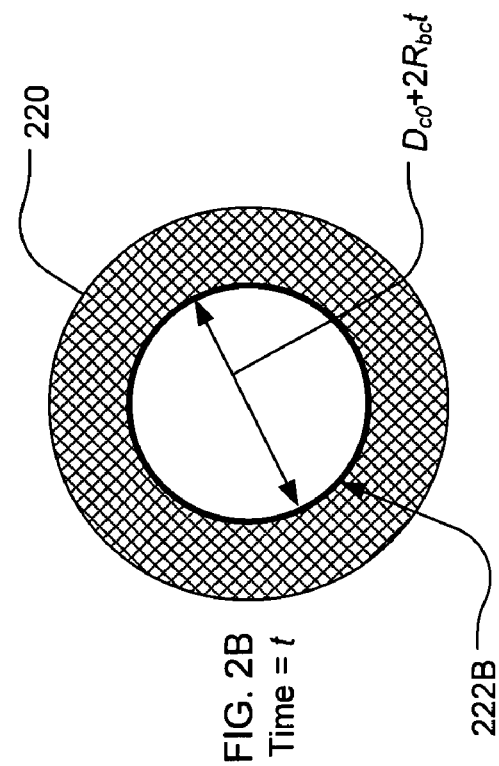
FIG. 2B is a cross-sectional end view of a propellant charge at a time t after ignition.
Figure 2D:
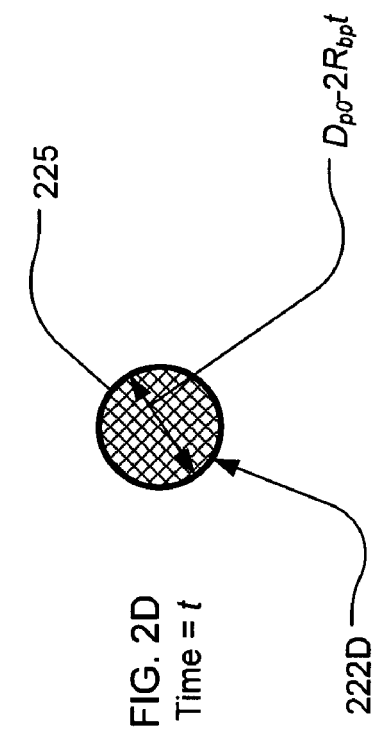
FIG. 2D is a cross-sectional end view of a propellant pellet at a time t after ignition.
Figure 2A:
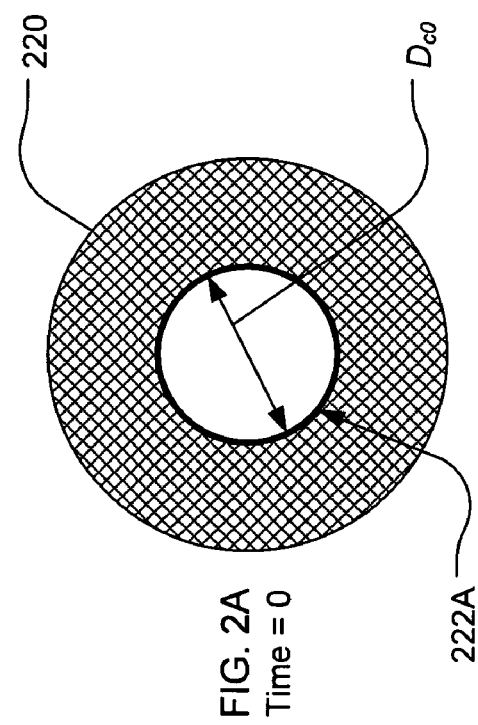
FIG. 2A is a cross-sectional end view of a propellant charge at ignition.

For ease of fabrication, the longitudinal cavity 130 may be shaped as a cylinder or slightly tapered cylinder. However, as shown in FIG. 2A and FIG. 2B, the thrust provided by a solid fuel rocket motor having a cylindrical longitudinal cavity may increase continuously as the grain is burned. FIG. 2A shows a cross sectional end view of an exemplary solid fuel rocket motor including a propellant charge 220 with a cylindrical longitudinal cavity. The burning surface of the propellant charge 220, immediately after ignition, is shown by the heavy line 222A. The area of the burning surface 222A of the propellant charge 220 is given by $\pi(L_c)(D_{c0})$, where $L_c$ is the length of the propellant charge 220 normal to the plane of FIG. 2, and $D_{c0}$ is the initial diameter of the longitudinal cavity.

FIG. 2B shows a cross sectional end view of the exemplary solid fuel rocket motor of FIG. 2A at a time t after ignition. The burning surface of the propellant charge 220 is indicated by the heavy line 222B. The diameter of the burning surface 222B is equal to $D_{c0}+2R_{bc}t$, where $R_{bc}$ is the burn rate of the propellant charge. Thus the area of the burning surface 222 at time t is increased compared to the area of the burning surface at ignition. The thrust of the solid fuel rocket motor at time t will be increased in proportion to the increase in the burning surface area. Consideration of FIG. 2A and FIG. 2B shows that the thrust of a solid fuel rocket motor having a propellant charge with a cylindrical longitudinal cavity will increase continuously as the propellant charge is burned. A propellant structure where the burning surface area increases as the result of combustion is said to have a "progressive burn".

Figure 2C:
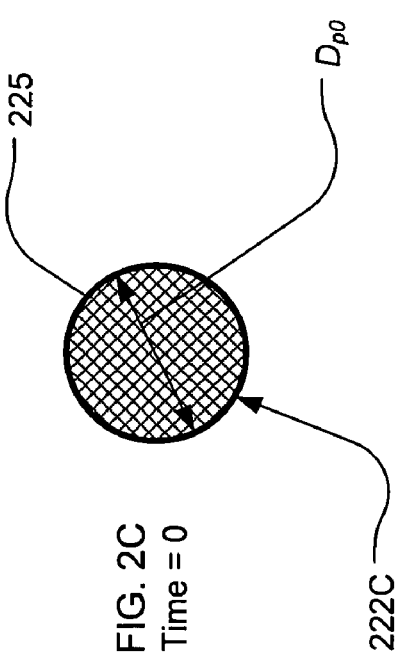
FIG. 2C is a cross-sectional end view of a propellant pellet at ignition.

FIG. 2C shows a cross sectional end view of an exemplary propellant pellet 225, which, for example, may be shaped as cylindrical disc having an initial diameter $D_{p0}$. Note that FIG. 2C and FIG. 2D are not drawn to the same scale as FIG. 2A and FIG. 2B. The size of the pellet 225 is exaggerated with respect to the size of the propellant charge 220. The circumferential burning surface of the propellant pellet, immediately after ignition, is shown by the heavy line 222C. The total area of the pellet burning surface consists of surface 222C and the two circular faces of the propellant pellet 225. The total burning surface area of a disc shaped pellet is given by $\pi(L_p)(D_{p0})+0.5(\pi)(D_{p0})^2$, where $L_p$ is the length of the propellant pellet 225 normal to the plane of FIG. 2.

FIG. 2D shows a cross sectional view of the exemplary propellant pellet 225 at a time t after ignition. The circumferential burning surface of the propellant pellet 225 is shown by the heavy line 222D. The diameter of the burning disc is equal to $D_{p0}-2R_{bp}t$, where $R_{bp}$ is the burn rate of the propellant pellets. Thus the area of the burning surface of the pellet at time t is decreased compared to the area of the burning surface at ignition. The thrust the propellant pellet 225 contributes to a solid fuel rocket motor at time t will be decreased in proportion to the decrease in the burning surface area. Consideration of FIG. 2C and FIG. 2D shows that the thrust of a solid fuel rocket motor using only propellant pellets will decrease continuously, after an initial ignition period, as the propellant pellets are burned. A fuel structure where the burning surface area decreases as the result of combustion is said to have a "regressive burn".

Figure 3:
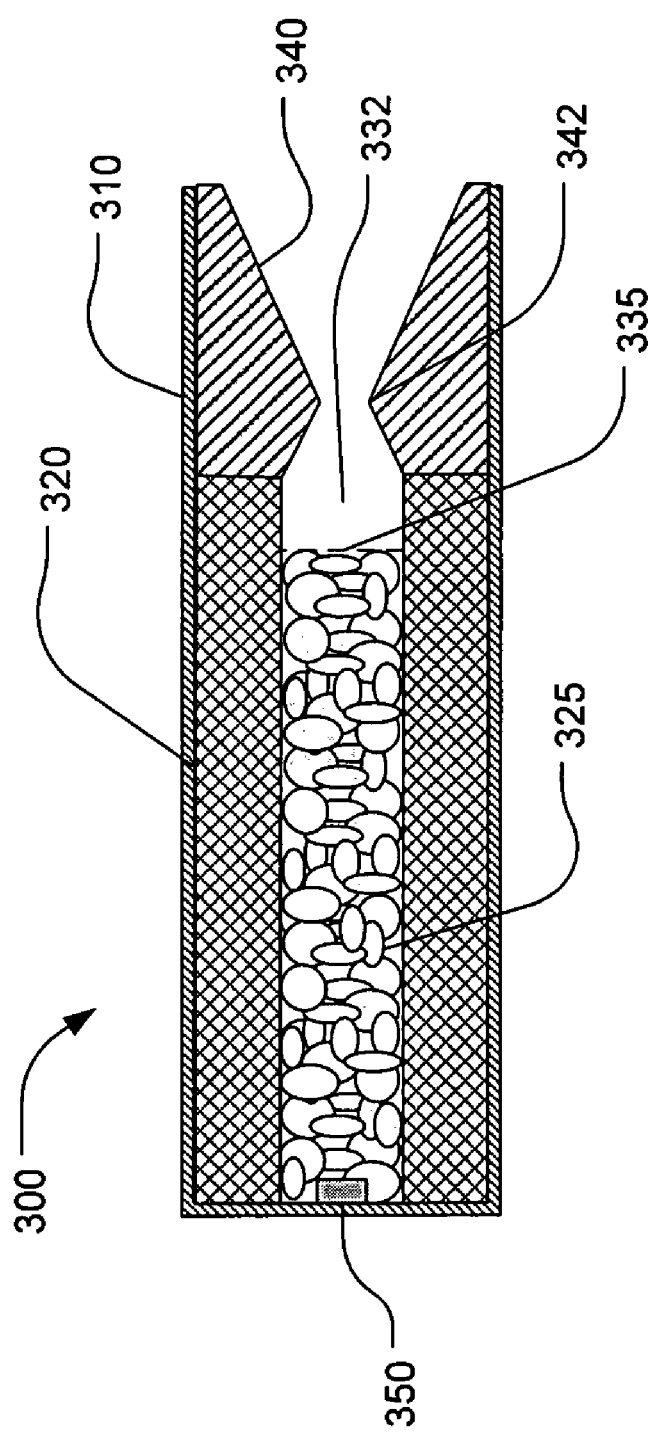
FIG. 3 is a cross-sectional side view of an exemplary hybrid solid fuel rocket motor.

Referring now to FIG. 3, a solid fuel rocket motor 300 may include a case 310, a propellant charge 320, a plurality of propellant pellets 325, a nozzle 340, and an igniter 350. Within this description, a rocket motor having both a bulk propellant charge and propellant pellets will be referred to as a "hybrid solid fuel rocket motor". This term must be not be confused with the term "hybrid rocket motor" commonly used to describe a rocket motor where either one of the fuel or oxidizer ingredients is a solid and the other is a liquid. Within this description, where appropriate, the term "bulk" propellant may be employed to distinguish the propellant charge 320 from the propellant pellets 325.

The hybrid solid fuel rocket motor 300 may include a large plurality (hundreds or thousands) of propellant pellets 325. The propellant pellets 325 may be disposed within a central cavity in the propellant charge, as shown, or elsewhere within the case 310. The solid fuel pellets 325 may be, for example, gas generator pellets that are produced in large quantities for use in automobile air bags.

Each of the plurality of propellant pellet 325 may be formed in a shape similar to that of a medicine tablet such as an aspirin. Each propellant pellet 325 may be formed in a short, generally cylindrical, shape with convex faces similar to an aspirin tablet. The convex faces may minimize the contact area between adjacent propellant pellets and thus prevent the propellant pellets from stacking or agglomerating. The convex faces may thus ensure that the plurality of propellant pellets 325 will have a very large total burnable surface area. Each propellant pellet may be formed in other shapes including flat discs, spheres, elongated cylinders, elongated cylinders with rounded ends, and other shapes.

Each propellant pellet 325 may be composed of at least some of an energetic fuel material and an oxidizer material. Each propellant pellet may contain additional binder and/or plasticizer material. The binder material and the plasticizer material may be reactive and may serve as a fuel material and/or an oxidizer material. Suitable compositions for propellant pellets are well known. Suitable compositions used for propellant pellets include, for example, compositions that are predominantly guanidine (or guanidinium) nitrate and basic copper nitrate, cobalt nitrate, and combinations thereof, as described in U.S. Pat. No. 5,608,183. At least 60% of the total mass of the propellant pellets 325 may be composed of guanidine nitrate and basic copper nitrate.

The propellant pellets 325 may have a combustion temperature, for example between 1500° C. and 1800° C., less than the combustion temperature of the propellant charge 320. The average temperature of the combustion gasses may be an average of the combustion temperatures of the composite and pellet propellants. The relative size of the propellant charge and the quantity of propellant pellets may be selected such that the average temperature of the combustion gasses is low enough (less than about 2500° C.) to allow components of the rocket motor that are exposed to the combustion products to be fabricated from Molybdenum or TZM (Titanium-Zirconium-Molybdenum) alloy.

The propellant pellets 325 may be randomly disposed within the rocket motor as shown in FIG. 3. Alternatively, the propellant pellets 325 may be stacked in an ordered manner. Many stacking arrangements may be possible depending on the size of rocket motor and the size of the propellant pellets. To facilitate stacking propellant pellets in an orderly manner, the rocket motor may include rods, guides, or other structure (not shown in FIG. 3) to position and retain the stacked pellets.

The propellant pellets 325 may be retained within the rocket motor by means of a perforated pellet retainer 335. The term "perforated" is intended to encompass any type or shape of openings in the structure of the pellet retainer, and does not imply any particular method of forming or creating the openings. The pellet retainer may prevent the unburned pellets from being ejected through the nozzle 340 while allowing passage of the exhaust gases produced when the propellant pellets 325 and the propellant charge 320 are ignited. The pellet retainer 335 may be formed of a thin metal material with machined or chemically formed perforations. The pellet retainer 335 may be formed of a woven or etched screen or mesh. The pellet retainer 335 may be formed as a single physical element, or may include a plurality of physical pieces such as, for example, a plurality of closely spaced metal discs, wires, or rods. However the pellet retainer is formed, the pellet retainer 335 will provide perforations or passages for the exhaust gases to flow to the nozzle 340. The perforations may be circular, square, rectangular, or elongated slits, or any other shape that allows passage for the combustion products while retaining the fuel pellets.

The perforations may be adapted to retain burning fuel pellets within the rocket motor until combustion has reduced the size of the pellets to less than a predetermined size. For example, at least one dimension of the perforations or openings in the pellet retainer 335 may be significantly smaller than any dimension of the unburned fuel pellets 325, such that a fuel pellet may not pass through the pellet retainer until combustion of the fuel pellet is nearly complete. When combustion of the fuel pellets 325 is nearly complete, at least some of the fuel pellets may be swept through the perforations in the pellet retainer 335 into the nozzle 340 by the flow of the combustion gases. The pellet retainer 335 may be positioned to form a cavity 332 between the pellet retainer 335 and the throat 342 of the nozzle 340. The cavity 332 may be initially devoid of propellant pellets. The length of the cavity 332 may be such that at least a portion of the partially burned fuel pellets passing through the pellet retainer are completely burned before the fuel pellets pass through the throat 342. Fuel pellets that are completely burned before passing through the throat 342 may fully contribute to the thrust of the rocket motor. Each fuel pellet that is still burning as it is ejected through the throat 342 may result in an incremental reduction in the total thrust provided by the rocket motor.

The presence of the pellet retainer 335 may, to some extent, restrict the flow of combustion gases from the burning fuel pellets 325 and the propellant charge 325 to the nozzle 340. To ensure that the pressure within the rocket motor is governed by the cross-sectional area of the throat 342, the total cross-sectional area of the perforations in the pellet retainer 335 may be larger than the cross-section area of the throat 342.

An igniter 350 may be disposed within the case to ignite the propellant charge 320 and the plurality of propellant pellets 325. Note that the igniter may directly ignite only a portion of the propellant charge 320 and/or the plurality of propellant pellets 325. The hot combustion gases from the ignited propellant may then rapidly ignite the remaining propellant.

Figure 4B:
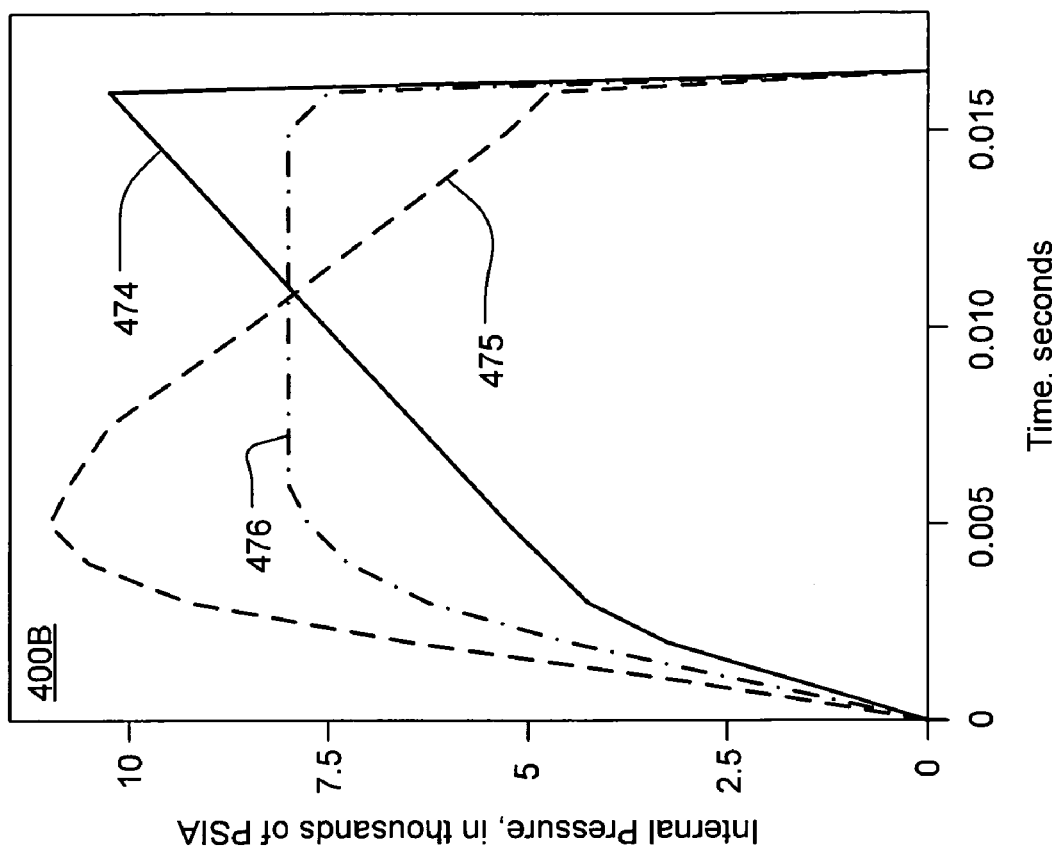
FIG. 4B is a chart of simulation results comparing internal pressures for propellant, pellet propellant, and hybrid solid fuel rocket motors.
Figure 4A:
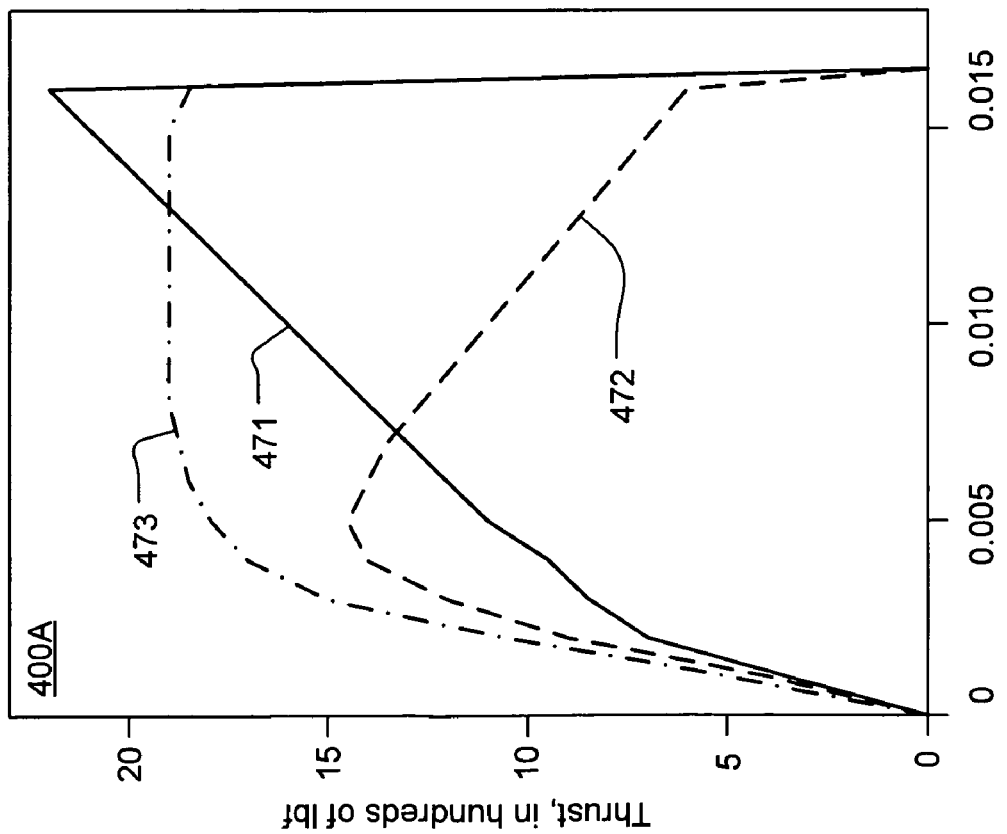
FIG. 4A is a chart of simulation results showing the thrust of an exemplary hybrid solid fuel rocket motor.

FIG. 4A shows the thrust, as a function of time, produced by three rocket motors using different propellants. The graph 400A plots results from simulations of the three different rocket motors. The solid line 471 is a plot of the thrust produced by a propellant charge, which is presumed to have a cylindrical longitudinal cavity. The surface of the propellant charge may be fully ignited at approximately 0.002 seconds. The thrust produced by the propellant charge may increase linearly from 0.002 seconds to 0.016 seconds due to a continuous increase in the burnable surface area. The propellant charge with a cylindrical longitudinal cavity exhibits a progressive burn. At 0.016 seconds, the propellant may be consumed, and the thrust may rapidly decrease. The solid line 471 represents the result of a simulation of the burn of an idealized propellant charge. Minor localized variations in the burning rate of the propellant charge and end effects may cause the thrust produced by a real rocket motor to deviate from the ideal.

The dashed line 472 is a plot of the thrust produced by a plurality of propellant pellets. The surface of the propellant pellets may be fully ignited at about 0.004 seconds. The thrust produced by the propellant pellets may then decrease, roughly linearly, from 0.004 seconds to about 0.016 seconds due to a continuous decrease in the burnable surface area. The dashed line 472 demonstrates that propellant pellets provide a regressive burn. At about 0.016 seconds, the propellant pellets may be consumed. The simulation assumed the propellant pellets were shaped as short cylindrical tablets, where the thickness of the tablet is smaller than the radius of the cylinder. In this case, the decreased in thrust between 0.004 seconds and 0.016 seconds is due to the reduction in the diameter and thickness of the cylinder as the pellets burn. The burn out at 0.016 seconds occurs when the combustion burns through the thickness of the pellets. The rate of decrease of the thrust produced by other types of propellant pellets may be determined by the shape of the pellets, and may not be linear in time.

The broken line 473 is a plot of the total thrust produced by an exemplary hybrid solid fuel rocket motor. The total thrust of the hybrid solid fuel rocket motor is essentially constant from about 0.006 seconds to 0.016 seconds. The interval of essentially constant total thrust occurs because the regressive burn (the reduction in thrust over time) of the pellet propellant effectively compensates for the progressive burn (the increase in thrusts over time) of the propellant charge during this time interval. A rocket motor where the thrust is essentially constant with time after the initial ignition period is described as having a "neutral burn".

FIG. 4B shows the internal pressure of the three rocket motors. The graph 400B plots additional results from simulations that produced the data previously shown in FIG. 4A. The solid line 474 is a plot of the internal pressure of the motor using a propellant charge. The maximum internal pressure, which occurs near the end of the progressive burn, is over 10,000 PSIA (pounds per square inch absolute).

The dashed line 475 is a plot of the internal pressure of the rocket motor using a plurality of propellant pellets. The maximum internal pressure, which occurs early in the burn when the pellets are fully ignited, is over 11,000 PSIA.

The broken line 476 is a plot of the internal pressure of the exemplary hybrid solid fuel rocket motor. The maximum internal pressure is about 8000 PSIA.

FIG. 4B illustrates the principle that, for equal total impulse, a rocket motor with a neutral propellant burn will have a maximum internal pressure that is lower than a rocket motor having either a progressive or regressive propellant burn. The external case of a rocket motor must be able to contain the maximum internal pressure. Thus, for equal total impulse, a rocket motor having either a progressive or regressive burn may require a stronger, and potentially heavier and more costly, case than a rocket motor having a neutral propellant burn.

For a hybrid solid fuel rocket motor to have a relatively neutral burn, two conditions must be met. First the burn time of the propellant charge and the burn time of the pellets must be approximately the same. Second, the rate of change of thrust for the propellant charge and the pellets must have approximately the same magnitude.

For example, a hybrid solid fuel rocket motor may include a cylindrical propellant charge with a cylindrical central cavity and a plurality of pellets shaped as discs, where the thickness of each disc is substantially less that its diameter. Assuming instantaneous ignition of the surface of the propellant charge, the burn time of the propellant charge may be approximately $(D_{c,max} - D_{c0})/(2R_{bc})$, where $D_{c,max}$ is the outside diameter of the propellant charge. Assuming instantaneous ignition of the propellant pellets, the burn time of the propellant pellets may be approximately $d_p/(2R_{bp})$, where $d_p$ is the thickness for a disc-shaped a propellant pellet. The burn times of the propellant charge and the propellant pellets (ignoring the ignition time) will be approximately the same if the following relationship is satisfied:

$$(D_{c,max} - D_{c0})/R_{bc} \approx d_p/R_{bp}. \quad (3)$$

Combining equation (1), equation (2), and FIG. 2B, the force produced by the propellant charge may be given by $$F_c = U_e * R_{bc} * P_{pc} * A_c(t) \quad (4)$$

where $F_c$ = force produced by the propellant charge $R_{bc}$ = propellant burn rate $P_{pc}$ = propellant density $A_c(t)$ = Propellant burning surface area as a function of time.

Combining equation (1), equation (2), and FIG. 2D, the force produced by the propellant pellets may be given by $$F_p = N * U_e * R_{bp} * P_{pp} * A_p(t) \quad (5)$$

where $F_p$ = force produced by the propellant charge $N$ = the number of propellant pellets $R_{bpc}$ = propellant pellet burn rate $P_{pp}$ = propellant pellet density $A_p(t)$ = Propellant pellet burning surface area as a function of time.

Differentiating (4) and (5) with respect to time, a hybrid solid fuel rocket motor may have a neutral burn if the following relationship is satisfied:

$$R_{bc} * P_{pc} * dA_c(t)/dt \approx -N * R_{bp} * P_{pp} * dA_p(t)/dt. \quad (6)$$

Figure 5:
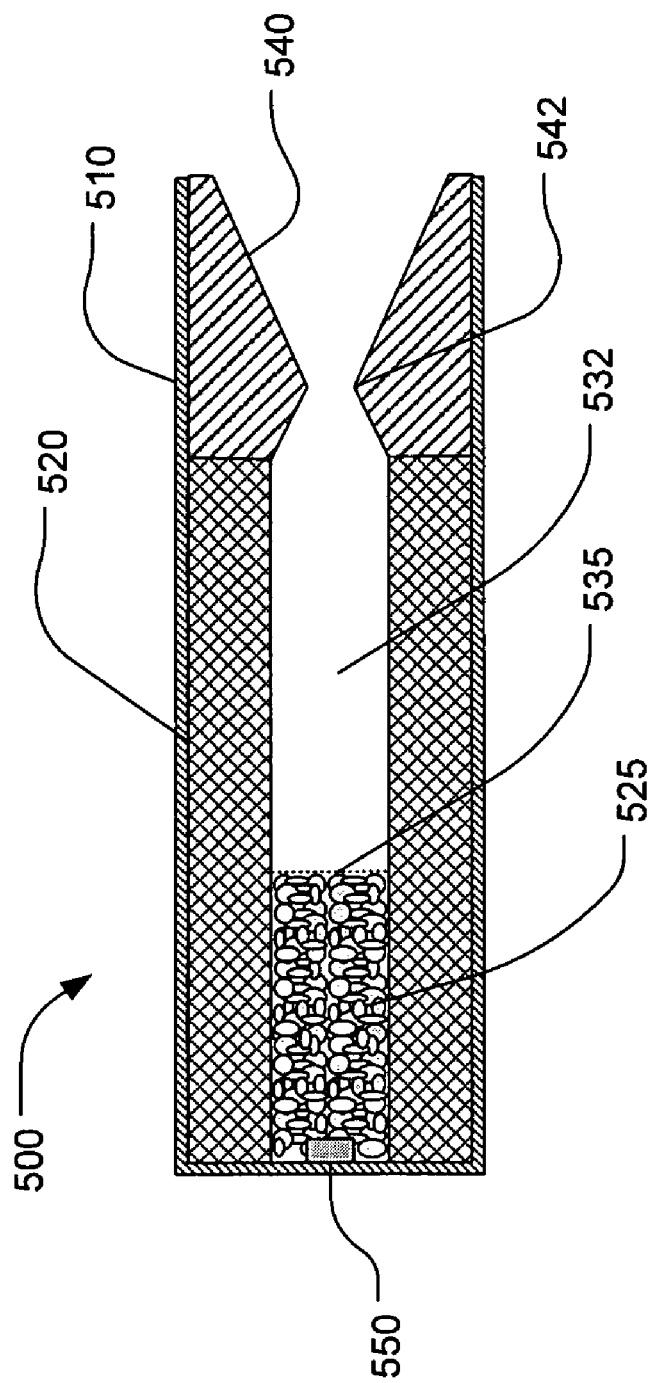
FIG. 5 is a cross-sectional end view of a propellant solid fuel rocket motor.

FIG. 5 shows an exemplary rocket motor which combines a propellant charge 520 and a plurality of propellant pellets 525 to provide an initial period of high thrust followed by a period of sustained lower thrust. This type of rocket motor, commonly called a "dual-burn" motor may be useful to quickly accelerate a missile to a cruising speed that may then be sustained. In FIG. 5, the propellant pellets 525 are shown as being smaller than the propellant pellets shown in FIG. 3 to imply that the propellant pellets 525 burn for a shorter period of time. However, as previously discussed, the burn time will be determined by both the shape and the burn rate of the propellant pellets 525. The propellant pellets in a dual-burn hybrid solid fuel rocket motor may be smaller than, larger than, or the same size as the propellant pellets in a neutral burn hybrid solid fuel rocket motor.

Figure 6:
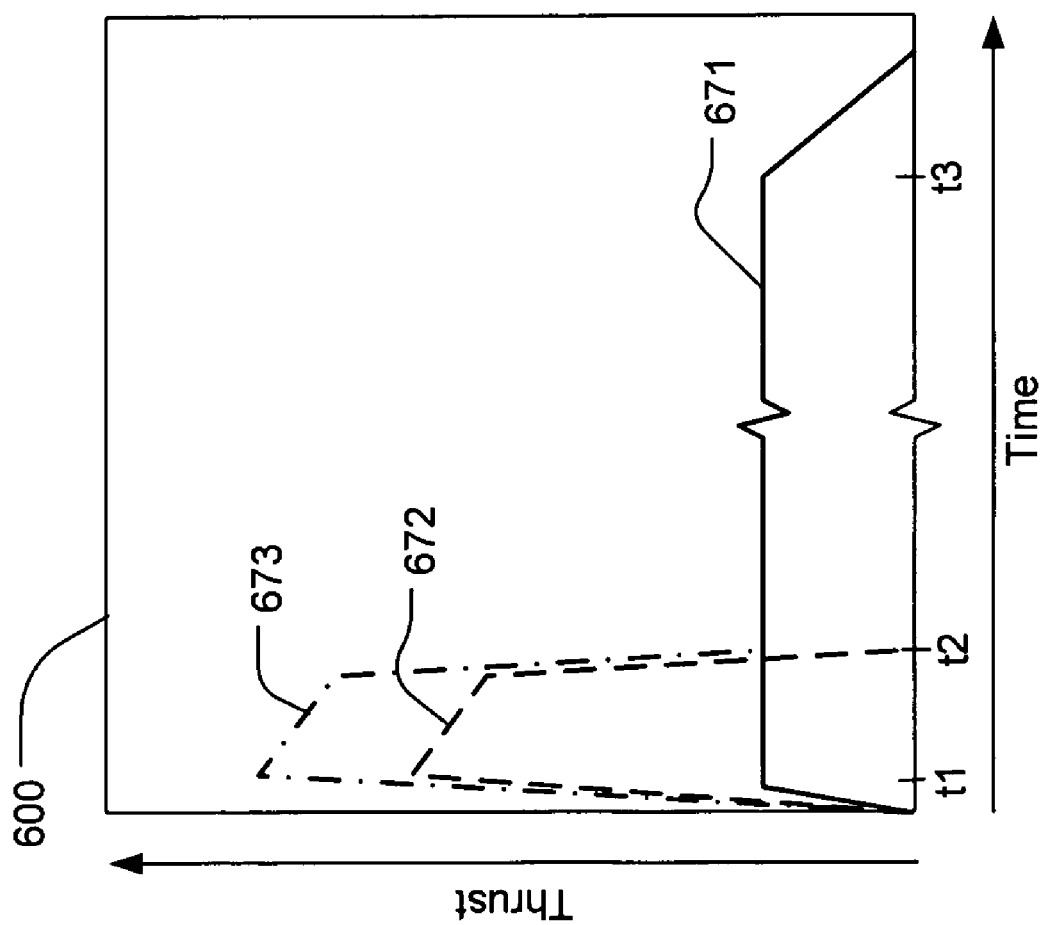
FIG. 6 is a chart of simulation results showing the thrust of an exemplary hybrid solid fuel rocket motor.
Figure 7B:
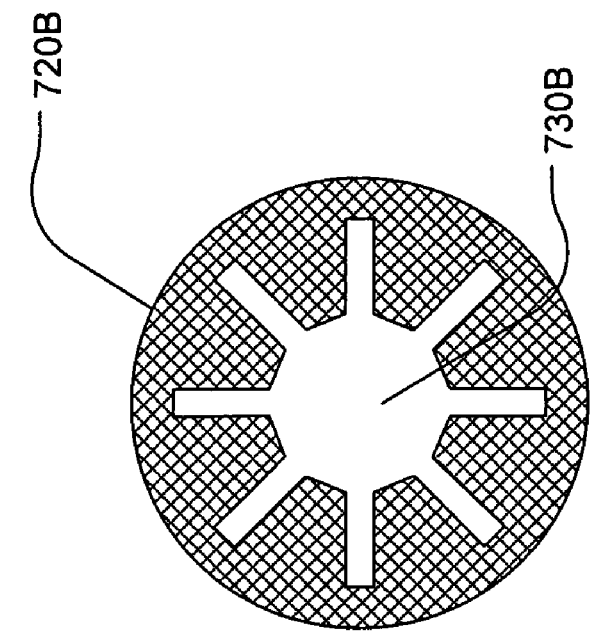
FIG. 7B is a cross-sectional end view of a propellant charge having a finocyl center perforation.
Figure 7A:
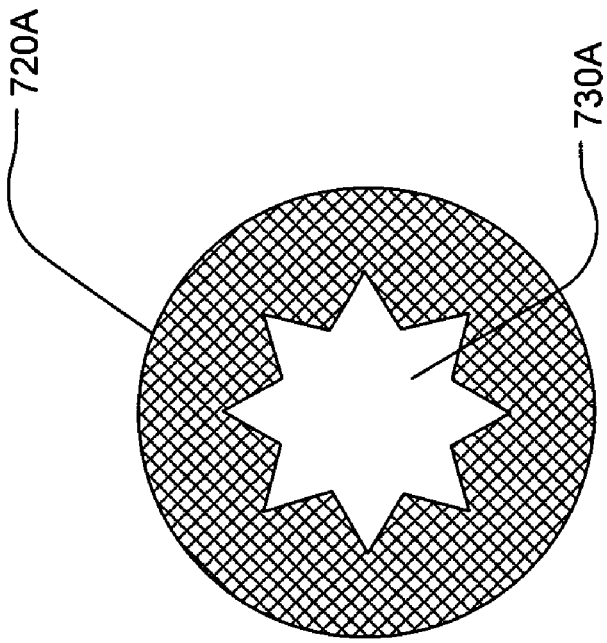
FIG. 7A is a cross-sectional end view of a propellant charge having a star-shaped center perforation.

FIG. 6 shows a graph 600 which plots the thrust, as a function of time, produced by a hypothetical dual-burn hybrid solid fuel rocket motor. The solid line 671 is a plot of the thrust produced by a propellant charge, which is adapted to provide a neutral burn. The propellant charge may have a star-shaped center perforation, as shown in FIG. 7A, or a finocyl perforation, as shown in FIG. 7B.

Returning to FIG. 6, the propellant charge is assumed to be fully ignited by time t1 and to provide constant thrust until a later time t3. The solid line 671 represents a hypothetical result for an idealized propellant charge. Minor localized variations in the burning rate of the propellant charge and end effects may cause the thrust produced by a real rocket motor to deviate from the ideal.

The dashed line 672 is a plot of the thrust produced by an plurality of propellant pellets. The surface of the propellant pellets is assumed to be fully ignited at time t1. The propellant pellets then provide high thrust until they are consumed at time t2. The burn time, from time t1 to time t2, of the propellant pellets may be substantially shorter than the burn time, from time t1 to time t3, of the propellant charge.

The broken line 673 is a plot of the total thrust produced by the hypothetical hybrid solid fuel rocket motor. The hypothetical hybrid solid fuel rocket motor provides high thrust from an initial period from t1 to t2, followed by sustained lower thrust from time t2 to time t3.

FIG. 8A and FIG. 8B show two additional exemplary hybrid solid fuel rocket motors. Each rocket motor 800A,B may include a propellant charge 820A,B and a plurality of propellant pellets 825A,B. Each plurality of propellant pellets 825A,B may be retained within the respective rocket motor by an appropriately formed pellet retainer 835A,B. It should be understood that the rocket motors of FIGS. 3, 5, 8A, and 8B are examples and that a propellant charge and propellant pellets may be integrated within a hybrid solid fuel rocket motor in many other configurations.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A solid fuel rocket motor comprising:
    a case
    a propellant charge disposed within the case
    a plurality of propellant pellets disposed within the case
    an igniter disposed to ignite the propellant charge and the plurality of propellant pellets
    a nozzle coupled to the case
    a pellet retainer to retain unburned propellant pellets within the case, wherein
        combustion gases flow from ignited propellant pellets to the nozzle through perforations in the pellet retainer
        a total of the area of the perforations in the pellet retainer is greater than a cross-sectional area of a throat within the nozzle
    wherein combustion gases from the propellant charge and from the propellant pellets flow through the nozzle to produce thrust.

2. The solid fuel rocket motor of claim 1, wherein the propellant pellets are disposed randomly within a portion of the case.

3. The solid fuel rocket motor of claim 1, wherein the perforations in the pellet retainer prevent propellant pellets from passing through the pellet retainer until combustion has reduced the size of the propellant pellets to below a predetermined size.

4. The solid fuel rocket motor of claim 3, wherein at least some of the propellant pellets complete burning after passing through the perforations in the pellet retainer and before passing through the nozzle.

5. The solid fuel rocket motor of claim 1, wherein
    the propellant charge has a progressive burn
    the propellant pellets have a regressive burn that compensates, at least in part, for the progressive burn of the propellant charge.

6. The solid fuel rocket motor of claim 5, wherein the propellant charge has one of a
    cylindrical center perforation and a tapered cylindrical center perforation.

7. The solid fuel rocket motor of claim 1, wherein the rocket motor provides an initial period of higher thrust when both the propellant charge and the plurality of propellant pellets are burning, followed by a period of lower thrust after the propellant pellets are consumed.

8. The solid fuel rocket motor of claim 7, wherein the propellant charge provides a neutral burn for at least a predetermined period after the propellant pellets are consumed.

9. The solid fuel rocket motor of claim 8, wherein the propellant charge has one of a star-shaped central cavity or a finocyl center cavity.

10. The solid fuel rocket motor of claim 1, wherein the propellant pellets have a combustion temperature below 1800° C.

11. The solid fuel rocket motor of claim 10, wherein at least 60% of the mass of the propellant pellets is guanidine nitrate and basic copper nitrate.

12. The solid fuel rocket motor of claim 10, wherein the pellet retainer is fabricated, at least in part, from one of molybdenum and TZM alloy.

13. The solid fuel rocket motor of claim 1, wherein an average temperature of the combustion gases produced by the propellant pellets and the propellant charge is below a predetermined temperature.

14. The solid fuel rocket motor of claim 13, wherein the predetermined temperature is set to allow the pellet retainer to be fabricated, at least in part, from one of molybdenum and TZM alloy.

15. The solid fuel rocket motor of claim 13, wherein the predetermined temperature is 2500° C.

16. A solid fuel rocket motor comprising:
    a case
    a propellant charge disposed within the case, the propellant charge having a progressive burn
    a plurality of propellant pellets disposed within the case, the propellant pellets having a regressive burn that compensates, at least in part, for the progressive burn of the propellant charge an igniter disposed to ignite the propellant charge and the plurality of propellant pellets a nozzle coupled to the case wherein combustion gases from the propellant charge and from the propellant pellets flow through the nozzle to produce thrust wherein a burn time of the propellant charge and a burn time of the propellant pellets are approximately equal.

17. A solid fuel rocket motor comprising:

a case a propellant charge disposed within the case, the propellant charge having a progressive burn a plurality of propellant pellets disposed within the case, the propellant pellets having a regressive burn that compensates, at least in part, for the progressive burn of the propellant charge an igniter disposed to ignite the propellant charge and the plurality of propellant pellets a nozzle coupled to the case wherein combustion gases from the propellant charge and from the propellant pellets flow through the nozzle to produce thrust wherein a rate of change of thrust of the propellant charge and a rate of change of thrust of the propellant pellets are approximately equal.

18. A solid fuel rocket motor comprising:

a case a propellant charge disposed within the case, the propellant charge having a progressive burn a plurality of propellant pellets disposed within the case, the propellant pellets having a regressive burn that compensates, at least in part, for the progressive burn of the propellant charge an igniter disposed to ignite the propellant charge and the plurality of propellant pellets a nozzle coupled to the case wherein combustion gases from the propellant charge and from the propellant pellets flow through the nozzle to produce thrust wherein the rocket motor provides essentially constant thrust during at least a portion of a motor burn time.

* * * * *